United States Patent

Meyer

[15] 3,695,654
[45] Oct. 3, 1972

[54] SOLID CYLINDRICAL MALE FASTENER AND STRUCTURAL ASSEMBLY

[72] Inventor: Engelbert A. Meyer, Union Lake, Mich.

[73] Assignee: USM Corporation, Warren Division, Mount Clemens, Mich.

[22] Filed: April 9, 1970

[21] Appl. No.: 26,855

Related U.S. Application Data

[63] Continuation-in-part of Ser. No. 766,200, Oct. 9, 1968, abandoned.

[52] U.S. Cl. ........................................ 287/189.36 R
[51] Int. Cl. ................................................ F16b 5/04
[58] Field of Search ............... 85/37, 72, 19, 10, 26; 287/189.35, 189.36, 189.36 B, 20.2 WS, 20.7 R, 20.3

[56] References Cited

UNITED STATES PATENTS

| | | | |
|---|---|---|---|
| 2,056,309 | 10/1936 | Osenberg | 85/19 |
| 1,365,117 | 1/1921 | Mees | 287/20.3 |
| 2,251,202 | 7/1941 | Purtel | 85/19 |
| 1,876,811 | 9/1932 | Whitworth | 287/189.36 B |
| 420,829 | 2/1890 | Platt | 85/37 |
| 1,111,393 | 9/1914 | Lachman | 287/20.2 WS |
| 1,362,557 | 12/1920 | Bunting | 287/189.35 |
| 46,504 | 2/1865 | Smith | 85/37 |

FOREIGN PATENTS OR APPLICATIONS

| | | | |
|---|---|---|---|
| 180,047 | 10/1954 | Austria | 85/19 |
| 409,982 | 5/1934 | Great Britain | |

*Primary Examiner*—Edward C. Allen
*Attorney*—Burton and Parker

[57] ABSTRACT

A male fastener adapted to secure a structural member to a support without perforation of the support includes a plurality of elongated resistingly deformable, ductile segments arranged in parallel contiguous relation and united along their lines of contiguity around a common axis providing an integral but axially separable generally cylindrical fastener with one end of the segments adapted to be welded or otherwise permanently secured to the support and with the opposite ends adapted to be axially split apart and deformed radially outwardly and downwardly to secure an underlying member to the support. The segments may be defined by radial grooves formed in one integral cylindrical member. The segments preferably are united in their integral relation within a radial dimension measured from the axis of the cylindrical fastener lying in a range of from 10 to 50 percent of the radius of the fastener.

8 Claims, 11 Drawing Figures

PATENTED OCT 3 1972
3,695,654
INVENTOR
ENGELBERT A. MEYER
BY
Burton & Parker
ATTORNEYS
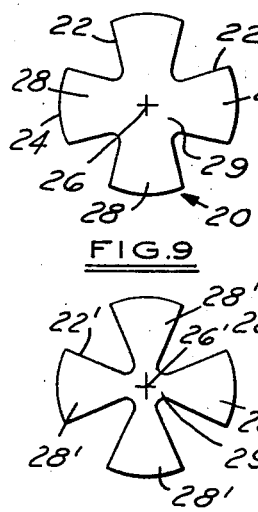
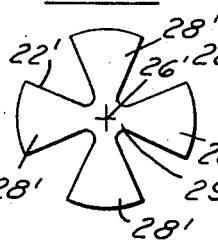
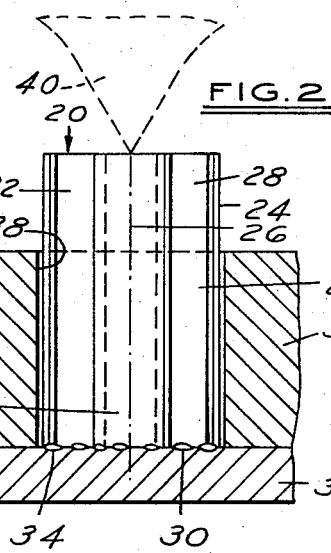
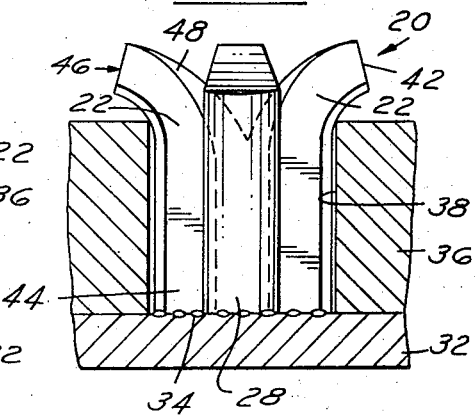
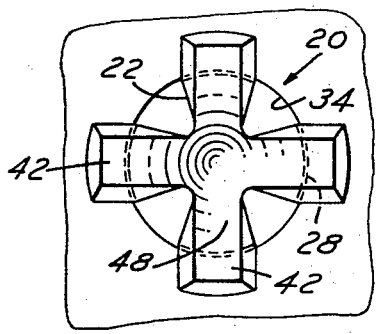
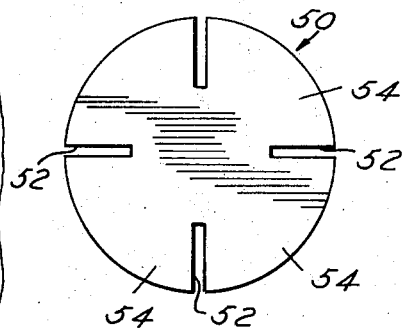
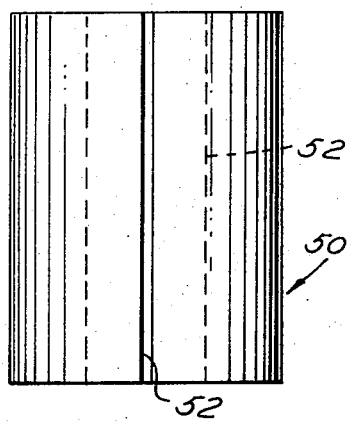
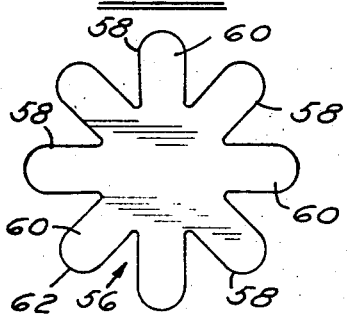
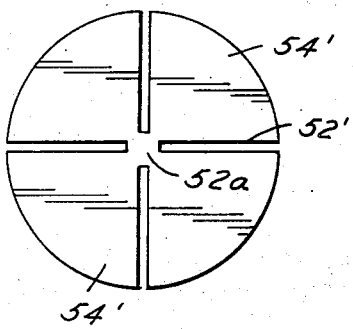
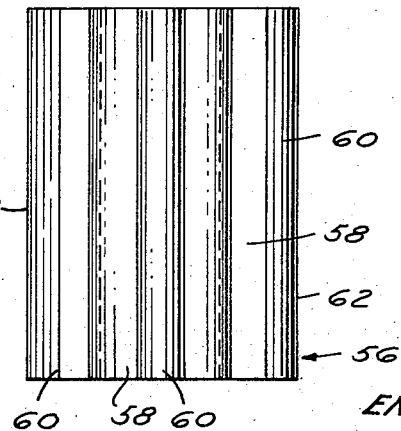
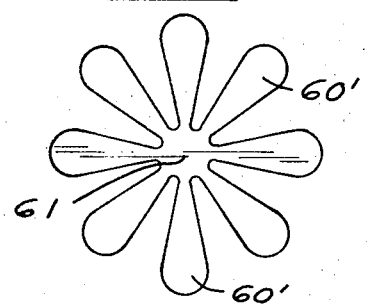

SOLID CYLINDRICAL MALE FASTENER AND STRUCTURAL ASSEMBLY

RELATED APPLICATION

This application is a continuation-in-part of my application Ser. No. 766,200, filed Oct. 9, 1968 and now abandoned.

FIELD OF THE INVENTION

This invention relates to solid cylindrical male fasteners, including weld on fasteners, adapted to secure a structural member to a support by deforming and enlarging the end of the fastener to overlie the structural member, the structural assembly, and the method of forming the structural assembly.

SUMMARY OF THE PRIOR ART

Tubular and solid rivets have long been utilized to secure two or more panels together, however rivets generally require an aperture through both of the panels, which requires drilling of the support panel prior to finishing, and registering the apertures prior to riveting. If the apertures do not exactly align, the panels must generally be redrilled or discarded. Further, riveting generally cannot be utilized where the combined thickness of the members is greater than the length of commercially available rivets. The latter problem has been solved to some extent by rivets which are received in a recess in the support, however, these rivets are generally not commercially accepted, and still require predrilling and registry of the aperture with the recess. The aperture through the panels also creates a corrosion problem, especially where the materials are electrolytically dissimilar, because the aperture or recess collects moisture and the panels are not usually sealed.

The prior art also includes a number of solid welding stud fasteners, which include welded threaded fasteners, and welded fasteners having subsequently deformed heads. The latter embodiments include in one instance a reduced diameter head portion adapted to be impacted over to secure a roofing panel, or the like, to a support, and in another instance a cup member for securing brake shoe liners to brake shoes. The fasteners are however relatively complex, and therefore are considered too expensive to manufacture for universal commercial applications. Further, the fasteners shown by the prior art must be individually designed depending upon the particular application.

More recently, weld on fasteners have been developed which are considerably simpler in design than the above referenced fasteners, and which have been commercially successful in many fields including the securement of trim and other devices to automobiles and applicances. The disclosed embodiments of these fasteners, however, require forming of a head portion on the fastener prior to securement to the support, and therefore must be welded or otherwise secured prior to receipt of the supported member.

SUMMARY OF THE INVENTION

The male fastener of this invention is adapted to secure a structural member to a support without perforation of the support. The support may be a panel member, such as an automotive or truck body panel, or a solid structural support including an I-beam or the like. The structural member must include a portion adapted to be received beneath the subsequently deformed head portion of the male fastener, but is otherwise not limited by this invention. The structural member may therefore be a panel member, such as utilized for truck siding or automotive applications, or may be a portion of a larger structural assembly.

The male fastener of this invention is solid and generally cylindrical, and is preferably formed from a relatively soft ductile material, permitting deformation of the head end of the fastener. The fastener includes a plurality of elongated, resistingly deformable, ductile segments which may be defined by longitudinal grooves or slits extending radially through the circumferential periphery of the cylindrical fastener toward the axis, but spaced therefrom to provide an area uniting the segments for axial splitting apart when the head is formed. The radial depth of the grooves may vary from approximately 50 percent to approximately 90 percent of the radius of the fastener, and in general the greater the radial depth the better, such that the area connecting the segments lies in the range of from about 10 percent to about 50 percent of the radius of the fastener. The ends of the fastener may be substantially flat and perpendicular to the axis to permit securement of the fastener to the support at either end. One end of the fastener is preferably welded or otherwise secured without perforation of the support, and the opposite end is deformed radially outwardly and toward the support to secure the structural member.

One embodiment of the fastener includes four V-shaped grooves and four radial portions therebetween which increase in width toward the circumference of the cylindrical fastener. The grooves or slits of the second embodiment are relatively narrow, and the third embodiment includes eight V-shaped grooves defining eight relatively narrow radial portions.

The structural assembly of this invention includes a support, a structural member overlying the support, and the solid male fastener described hereinabove interconnecting the structural member and the support. The male fastener includes a cylindrical portion, secured to the support without perforation thereof, and a head portion integral with the body portion and formed therefrom. The head portion includes a plurality of radially extending arms, continuous with the radial portions of the body portion, deformed radially outwardly to overlie the structural member and tensioned thereagainst to secure the structural member on the support.

The method of this invention includes disposing the structural member on the support in overlying relation, welding or otherwise securing the solid male fastener described hereinabove to the support without perforation of the support, and splitting and simultaneously curling the radial portions at the end of the fastener opposite the support to provide a plurality of radially extending arms overlying the structural member and securing it to the support. The head portion may be formed with a special pointed tool which simultaneously splits and curls the radially extending arms, resulting in a conical recess in the end of the fastener opposite the support.

Other advantages, and meritorious features of this invention will more fully appear from the following description of the preferred embodiments, claims, and accompanying drawings, wherein:

FIG. 1 is a top view of one embodiment of the solid male fastener of this invention;

FIG. 2 is a side elevation of the male fastener shown in FIG. 1, secured to the support;

FIG. 3 is a side, partial cross sectional view of the fastener shown in FIG. 2, securing a structural member on the support;

FIG. 4 is a top view of the structural assembly shown in FIG. 3;

FIG. 5 is a top view of another embodiment of the male fastener of this invention;

FIG. 6 is a side elevation of the male fastener shown in FIG. 5;

FIG. 7 is a top elevation of another embodiment of the male fastener of this invention;

FIG. 8 is a side elevation of the male fastener shown in FIG. 7; and

FIGS. 9-11 are respectively modifications of FIGS. 1, 5 and 7.

DESCRIPTION OF THE PREFERRED EMBODIMENTS

The disclosed embodiments of the male fastener of this invention are solid and initially generally cylindrical. The configuration of the longitudinal grooves or slits is however different in each of the disclosed embodiments. The embodiment of the male fastener 20 shown in FIGS. 1 and 2 includes four generally V-shaped longitudinal grooves 22 which extend radially through the circumferential periphery 24 of the cylindrical fastener toward the axis 26 of the circumscribing cylinder, but are spaced therefrom to define four radial portions or segments 28 therebetween. The radial depth of the grooves is such that the segments 28 are united along their lines of contiguity by an area 29 which extends radially, measured outwardly from the axis of the fastener, approximately 40 percent of the radius of the fastener. In this embodiment of the fastener, the thickness of each of the radial portions or segments 28 increases toward the circumference 24 to define a "formee cross," except that the peripheral surface is cylindrical, rather than flat. It will be noted that the segments 28 are parallel and contiguous and arranged around a common axis 26.

One end 30 of the male fastener has been welded to a supporting member 32 in FIG. 2. The weld preferably extends across the entire mating surface as shown at 34 in FIGS. 2 and 3 whereby the ends of the segments 28 are welded to the supporting member. It should be noted that the fastener does not perforate the support 32. The male fastener of this invention may be secured subsequent to the receipt of the supported structural member 36, which is a considerable advantage in many applications. In this embodiment, the structural member includes an aperture 38 which receives the fastener therethrough, and therefore the male fastener may be secured before or after receipt of the structural member.

The fastener is preferably formed from a soft ductile material to permit deformation of the end of the fastener without fracturing. The end of the fastener may be deformed with a pointed impact tool, or the like, the end of which is shown in phantom at 40 in FIG. 2. The tool is designed to simultaneously split apart the segments axially along their lines of contiguity and curl the ends of the segments outwardly to form a plurality of radially extending arms 42, as shown in FIGS. 3 and 4, which overlie and retain the structural member 36.

The resultant structural assembly shown in FIGS. 3 and 4 includes a support 32, a structural member 36 overlying the support including an aperture 38, and a male fastener 20 received through the aperture 38 and secured to the support without perforation thereof. The male fastener includes a cylindrical body portion 44, including four longitudinal grooves 22 defining four radial portions or segments 28 therebetween, and a head portion 46. The head portion 46 includes four radially extending arms 42 continuous with the radial portions 28 and formed in situ therefrom, and a generally conical recess 48 formed by the impact tool head shown in phantom at 40. The arms 42 gradually curl upwardly and outwardly to overlie the structural member 36 adjacent the aperture 34, as shown in FIG. 3, and are tensioned thereagainst to securely retain the structural member on the support.

The method of this invention includes disposing the structural member 36 on the support 32, welding or otherwise securing the cylindrical male fastener 20 to the support 32, preferably without perforation of the support, and splitting and simultaneously curling the end of the fastener opposite the support to form a plurality of radially extending arms 42 which overlie and secure the structural member 36 on the support.

The FIG. 9 embodiment is generally similar to that of FIGS. 1 and 2 except the grooves 22' are deeper with the segments 28' joined by an area extending outwardly from the axis 31' a distance equal to about 20 percent of the radius of the fastener and with the segments 28' narrower at their radially inner ends than the FIG. 1 embodiment. As a consequence the FIG. 9 embodiment will split more readily as the pointed tool 40 is driven into it.

The cylindrical male fastener 50 shown in FIGS. 5 and 6 includes four narrow slits or grooves 52, which define four relatively broad radial portions 54 therebetween. The fastener may be formed from a cylindrical wire section, or the like, which is thereafter slit longitudinally as shown. The slits extend radially inwardly to approximately 50 percent of the radius fastener thereby leaving an unslit area equal to about 50 percent of the radius which unites the segments 54. In FIG. 10 the slits 52' extend about 90 percent of the radius toward the axis of the member, leaving but a small portion (about 10 percent of the radius) 52a connecting the segments 54' together. As a result, the FIG. 10 embodiment will split more readily than that of FIG. 5 as the pointed tool 40 is driven against the connecting portion 52a.

The embodiment of the cylindrical male fastener 56 shown in FIGS. 7 and 8, includes eight V-shaped grooves 58 which define eight relatively narrow radial portions 60 therebetween. The periphery 62 of the radial portions of this embodiment may be rounded as shown. In FIG. 11 the grooves 58' extend more deeply, approximately 80 percent of the radius, than do the grooves 58 of the FIG. 7 embodiment which extend only to about 50 percent of the radius of the fastener. As a consequence the segments 60' may be split apart more readily as the pointed tool 40 is driven axially into the segment connecting portion 61 of the fastener. Of course it is to be understood that the cylindrical male fasteners shown in FIGS. 5 to 11 may be secured to a support and deformed as shown in FIGS. 3 and 4, by the method described hereinabove.

It will be understood by those skilled in the art that the male fastener and the other elements of the structural assembly of this invention may be formed from various materials. The support and male fastener may preferably be formed from various metals, if the fastener is to be welded on the support, however heat and solvent welding techniques may be utilized for plastic materials. The fastener is preferably formed from a soft ductile material which may be deformed as shown in FIGS. 3 and 4. The fastener therefore may be formed from steel, including SAE 1008 or 1010 steel, copper, brass, aluminum, or various plastic materials. The embodiment of the cylindrical male fastener shown in FIGS. 1, 2 and 5–11 may be extruded from wire stock, and the embodiment shown in FIGS. 5, 6 and 10 may be formed from an extruded wire section, which is subsequently slit as shown.

I have discovered that in general the radially deeper the grooves are which separate the segments, such as the segments 28 or 28' in FIGS. 1 and 9, or the segments 54 and 54' in FIGS. 5 and 10, or the segments 60 and 60' in FIGS. 7 and 8, the more easily may they be separated and caused to curl outwardly to lock the structural part 36 on the panel 32, and yet there is no appreciable reduction in the strength of the resulting structural assembly. Once the end 30 of the fastener has been welded as at 34 to the panel across the entire interface between the panel and such end, then the core or axis portion such as the connecting portion 52a in FIG. 10 has fulfilled its primary role of temporarily integrating the segments prior to welding. I have found that if the segments, or radial portions, are united in an area extending radially a distance lying in the range of from 10 to 50 percent of the radius of the fastener, as shown and described above, a highly satisfactory fastener may be provided, though the radially smaller this area the more readily will the segments split apart and curl to form the fastener head.

What is claimed is:

1. A structural assembly comprising: a support, a generally cylindrical essentially solid male fastener secured at one end to the support without perforation of the support, said male fastener including a plurality of elongated resistingly deformable, ductile, fastener segments arranged in parallel contiguous relation and extending radially from the axis of the fastener to the cylindrical surface thereof and extending along the fastener and united along their lines of contiguity around said axis within a radial dimension measured from said axis not exceeding substantially 50 percent of the radius of the fastener and forming an integral but axially separable fastener structure, a structural member overlying the support, and an integral head on the male fastener overlying the structural member and tensioning the member toward the support, said head formed in situ and comprising said segments axially separated from each other above the structural member and deformed radially outwardly and downwardly toward and into stressed engagement with the structural member tensioning the structural member toward the support.

2. The invention defined by claim 1 characterized in that said segments of the male fastener are defined by radial grooves extending from the periphery of the generally cylindrical fastener toward the axis thereof and said segments are united in said integral relation from the bottom of said grooves toward the axis of the generally cylindrical fastener.

3. The invention defined by claim 1 characterized in that the segments are united throughout a radial dimension lying in the range from approximately 10 percent to approximately 50 percent of the radius of the generally cylindrical fastener.

4. The invention defined by claim 1 characterized in that the male fastener includes four substantially uniform evenly spaced segments defining a cruciform in cross-section.

5. The invention defined in claim 1 characterized in that said grooves increase in width toward the circumference of the generally cylindrical fastener.

6. The invention defined in claim 12 characterized in that said grooves are generally V-shaped.

7. The invention defined in claim 12 characterized in that said grooves are relatively narrow such that the segments are generally pie-shaped in cross-section.

8. The invention defined in claim 1 characterized in that the opposite ends of the segments of the male fastener are flat and co-planar and extend substantially perpendicular to the axis of the generally cylindrical male fastener and the male fastener is welded to the support completely across the interface defined by one end of the segments and the surface of the support.

* * * * *

UNITED STATES PATENT OFFICE
CERTIFICATE OF CORRECTION

Patent No. 3,695,654  Dated October 3, 1972

Inventor(s) Engelbert A. Meyer

It is certified that error appears in the above-identified patent and that said Letters Patent are hereby corrected as shown below:

Column 6, line 38, change numeral "12" to --1--.

Column 6, line 40, change numeral "12" to --1--.

Signed and sealed this 20th day of February 1973.

(SEAL)
Attest:

EDWARD M. FLETCHER, JR.
Attesting Officer

ROBERT GOTTSCHALK
Commissioner of Patents